Aug. 23, 1938.                M. SCHMIDT                2,127,787
WATER TUBE STEAM GENERATOR
Filed July 17, 1935         5 Sheets-Sheet 1

INVENTOR:
MARTIN SCHMIDT
ATTORNEYS:

Aug. 23, 1938.   M. SCHMIDT   2,127,787
WATER TUBE STEAM GENERATOR
Filed July 17, 1935   5 Sheets-Sheet 2

INVENTOR:
MARTIN SCHMIDT
ATTORNEYS:

Aug. 23, 1938.    M. SCHMIDT    2,127,787
WATER TUBE STEAM GENERATOR
Filed July 17, 1935    5 Sheets-Sheet 3

INVENTOR:
MARTIN SCHMIDT
ATTORNEYS:

INVENTOR:
MARTIN SCHMIDT
ATTORNEYS:

Aug. 23, 1938.  M. SCHMIDT  2,127,787
WATER TUBE STEAM GENERATOR
Filed July 17, 1935   5 Sheets-Sheet 5

INVENTOR:
MARTIN SCHMIDT
ATTORNEYS:

Patented Aug. 23, 1938

2,127,787

UNITED STATES PATENT OFFICE 2,127,787

WATER TUBE STEAM GENERATOR

Martin Schmidt, Kassel-Land, Germany

Application July 17, 1935, Serial No. 31,806
In Germany August 6, 1934

9 Claims. (Cl. 122—249)

The invention relates to improvements in water-tube steam boilers.

Water-tube boilers are known which have steam-generating tubes to which only so much water is fed as can be evaporated by one passage through the tubes, the steam generated from this water being then withdrawn. Such boilers contain only a small quantity of water in those parts which are subjected to heat. Consequently, they can be heated up in a short time and have the advantage that they cannot explode. Their efficient operation, however, is dependent to a great extent on reliable and accurate adjustment of the feed water and constant regulation of the source of heat.

If the water feeding apparatus fails, the cooling of those parts of the heated tube surfaces which are normally cooled by the steam-water mixture and steam flowing through the tubes immediately ceases, and there is danger that the tubes will be burned out.

Water-tube boilers are also known which, in addition to the quantity of water which is continuously fed into them and converted into steam during a single passage through the tubes, contain a further quantity of water, so that a steam-water mixture is delivered by the steam-generating tubes into the drum, where the separation of the steam from the excess water takes place. The water flows through downcomer tubes to a lower collector, from which the steam-generating tubes extend, and into which feed-water corresponding to the quantity evaporated is fed.

For the establishment of the natural circulation desirable in such a water-tube boiler, the inertia of the comparatively large mass of water on the downcomer side is disadvantageous.

In addition, considerable time is necessary for the generation of steam on heating up, because the water heated at each passage does not immediately return to the steam-generating tubes, but impinges in the first place against the water in the downcomers and loses its kinetic energy, while fresh feed-water follows from the lower water container. On starting up, therefore, a comparatively large quantity of water must be heated to the point of evaporation.

In order to avoid these disadvantages and to improve the natural circulation, according to the present invention, the water in the steam-generating tubes, after the removal of steam therefrom, continues its flow to downcomer tubes by which it is led to the steam-generating tubes, the two types of tubes thus forming circulating units, through which the circulating water content of the steam-generator is divided into separate or individual circulations independent of each other.

An essential advantage of the invention consists in the fact that the velocity of the water flowing from the steam-generating tubes to the downcomer tubes is utilized for the circulation. As the water carried upwards in the steam-generating tubes continues to flow past the highest point, no water column can form in the upper part of the steam-generating tubes which would hinder the free outflow of steam. In consequence of the division of the water content of the new water-tube boiler into many small quantities which are present as circulating units, no mass of water of large inertia is present at any point of the boiler. The smaller the resistance to flow in the individual circulation units, the more easily movable are the small quantities of water.

In consequence only slight pulsations with small reactions can occur, which do not disturb the steady circulation, so that an efficient cooling of the heated steam-generating surfaces is ensured by the water flowing past them.

In consequence of the favorable conditions of circulation, the water content, in itself small, of a circulation unit can be altered within wide limits without danger.

With a large water content, the process of evaporation is similar to that in a water-tube boiler with natural circulation. The water content is, however, in relation to the heating surface or to the quantity of water evaporated, only a fraction of that in ordinary water-tube boilers. With average water content, which is present in normal working, the evaporating process takes place as in a flash boiler with an excess of feed. The more the water content is decreased, the more similar is the process of evaporation to that of a simple flash boiler.

This wide freedom as regards the additional water content of the circulation unit gives a very high degree of safety to a flash boiler, and, further, a uniformity of steam generation even if the adjustment of the feed and fire is accelerated or delayed.

The form of the circulation units is so chosen as to present the least possible resistance to the circulation in the tubes. Sudden changes in direction and alterations of cross-section are avoided in order not to dissipate the kinetic energy of the moving steam-water mixture.

In the new boiler, the water cannot take an arbitrary path as in water-tube boilers with drums, but on the contrary, flows continuously and automatically either in each individual circulation unit or in individual groups of such units, or again, through the entire tube system.

The water must therefore always take a definite path predetermined by the construction so that a uniform cooling of all the tubes is assured.

Since in the new boiler, even under different conditions of load and operation, for example, even with varying quantities of water in the circulation units, the riser parts of the circulation units are well cooled, the heating surfaces can be worked at a high rating.

The new boiler combines the essential advantages of known flash boilers and water-tube boilers without the disadvantages mentioned above as occurring in boilers of these types.

As contrasted with the flash boiler, the new boiler is distinguished particularly by its lower sensitiveness and increased safety in operation. On this account, it is especially suitable even for coal firing and, by virtue of its small weight, as a boiler for light vehicles such as rail motor cars, trucks and the like, and can in addition be advantageously applied in power installations as an auxiliary for peak loads.

Also with rapidly varying loads, for example, in rail motor cars, a safer operation without the application of complicated regulating apparatus is ensured and a further latitude in the water content is provided so as to prevent on the one hand undesirable loss of water and on the other hand an unpermissible overheating of the steam in the circulation units.

On account of the lower degree of sensitiveness of the new boiler, the feed, as above mentioned, can be to a certain extent accelerated or delayed; in addition, if the feed pump fails, the steam-generating tubes are not immediately endangered.

It will be seen that in a water-tube boiler according to the present invention, it is necessary to provide efficient apparatus for separating the steam and water and a further part of the present invention deals with apparatus which, while suitable for the specific use referred to, is also applicable generally for separating gas and/or vapor from a mixture of gas and/or vapor and liquid flowing through a tube, but for convenience this part of the invention will be described below with reference to a mixture of steam and water except where otherwise indicated.

Hitherto the separation of steam from a mixture of steam and water produced in evaporating tubes, has been commonly effected in a steam-and-water drum into which the open ends of the evaporating tubes deliver.

If the discharge of these tubes lies below the surface of the water, the steam generated must then force its way through the superincumbent layer and in consequence must entrain a quantity of water, but even if the evaporating tubes discharge into the steam space of the drum, the steam must still contain a large proportion of water because, in the mixture ejected, the steam and water are in a state of relative turbulence and so prevent the desired sudden separation of the steam and water particles.

For such reasons, in order to obtain dry steam, steam separators or driers have been constructed which for the separation of the steam and water rely either on the impact principle, or on the action of centrifugal force, or on sudden changes of direction.

In all these cases, however, the disadvantage is present that the kinetic energy in the steam-water mixture at the upper end of the evaporating tube is dissipated.

Such a loss of kinetic energy is disadvantageous, for example, if the water, more or less freed from steam, continues to circulate by being led through downcomers back to the evaporating tubes, because on account of the check to the circulation, the mass of water must be accelerated again.

In contrast to such arrangements, this part of the present invention is characterized by the fact that, over a sufficiently long stretch of the flow-path of the mixture, transfer ducts are provided leading to a pipe or container and connected to the mixture tube, so that over this stretch the gas or vapor can freely separate and pass into the connected pipe or container from the liquid, which continues to flow in the mixture tube.

In consequence of this arrangement, no separator container is interposed in the flow-path of the mixture, and in addition the tube traversed by the mixture does not pass through a container.

In contrast to the processes of separation carried out in steam-separating drums and in known steam driers, the separation of steam and water according to this part of the present invention is not brought about through stopping or interrupting the flow of water, preferably assisted by the action of impact, or by sudden changes of direction, but by providing a sufficiently long stretch of the path of flow, and thereby a sufficient length of time, so that the steam can escape freely from the water, which continues its course unchecked.

The separation of the steam from the moving mixture is effected by connecting a riser tube to a section of tube preferably running either horizontally or with a slight inclination. In this section, for example, a lead-off pipe is connected to the mixture tube into which pipe issue holes or openings provided in the upper wall of the mixture tube.

From a mixture flowing through a curved tube, according to this part of the present invention steam can be separated on the inner side of the curve since the water, under the action of centrifugal force, moves in contact with the outer half of the curved tube.

It is already known to withdraw steam on the inner side of a curved tube from a mixture of steam and water flowing therethrough. With this object, a tubular connection is introduced into the curved tube from the outer side of the bend, which is provided near the inner wall of the curved tube on the side turned away from the direction of flow with a small inlet opening for the steam.

A substantial separation of steam from the moving water cannot, however, be effected in this manner.

In contrast thereto, according to this part of the present invention, as great as possible a separation of steam is effected by connecting to the inner side of the curved tube, a lead-off pipe, into which an elongated discharge opening, comprising perforations provided in the inner wall of the bend over a sufficiently long stretch, discharges.

Further objects and advantages of the invention will appear more fully from the following description, particularly when taken in conjunction with the accompanying drawings which form a part thereof.

In the circulation units shown in Figures 1 to 4, the heated riser or steam generating tube is indicated at 1, and the unheated or only slightly heated downcomer at 2. In the upper part of the unit, the riser is connected to the downcomer by a bend having a large radius of curvature and at the bottom by a bend with a smaller radius of curvature, sudden changes of direction being thus avoided throughout so that a circulation unit is provided with a closed circulating path free from obstruction.

Figures 1, 2, 8:
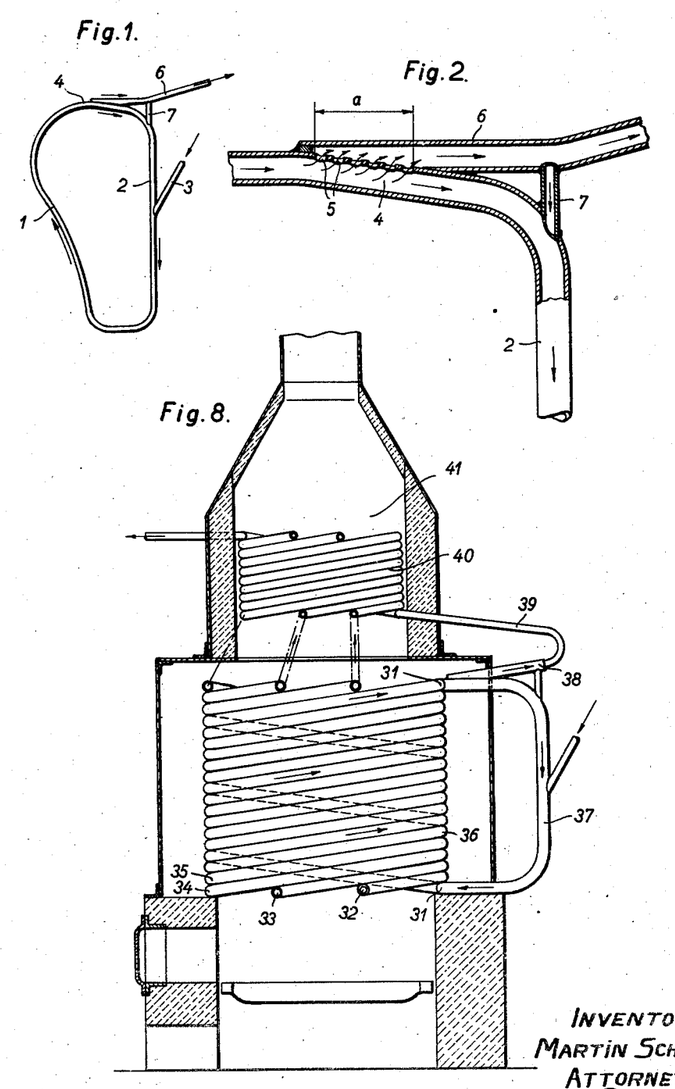
Figure 1 shows a diagrammatic view of a circulation unit according to the invention.
Figure 2 is a cross section, on a larger scale, of the upper part of the unit showing one form of apparatus for separating the steam generated from the circulating water.
Figures 7, 8 and 9 are diagrammatic vertical sections through three further forms of construction of the new boiler.

By means of a pipe 3, feed water is fed into the downcomer 2 in the same direction as the flow therein, the steam generated in the riser part being led off at the upper intermediate part of the unit where the riser connects with the downcomer.

With this object, a lead-off pipe 6 is connected to the intermediate tube 4 which is provided with holes or slits 5 opening thereinto. In addition, a connecting pipe 7 is provided between the steam outlet duct 6 and the downcomer 2, so that water condensed or entrained can escape into the downcomer.

By virtue of the bend of large radius, the steam-water mixture in the riser 1 is transferred without substantial resistance to flow into the more or less horizontal length 4, in which it can continue flowing at a high velocity. In this length of tube 4 a comparatively long path is provided in which steam can separate by passing through the openings 5 into the steam lead-off pipe 6.

The length within which the separation of steam from the continuously moving water is completed is indicated in Figure 2 by $a$.

In this modification, the individual circulating units, each formed of riser and downcomer parts, are independent from one another so that the circulation of the individual small quantities of water likewise takes place with complete independence in each unit. This construction has the advantage that the circulation is not disturbed by steam-generating processes working under other conditions of circulating and heating, so that no deflection of the flow of water occurs through suction due to other steam-generating tubes.

Figure 3:
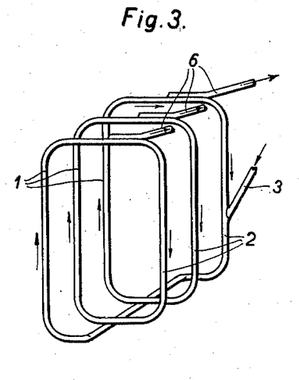
Figure 3 shows diagrammatically one form of a group of circulation units connected in series to form a coil with a horizontal axis.

In the form of the invention shown in Figure 3, three circulation units, each comprising a riser and a downcomer, are connected into a group closed in itself. The first riser 1 is connected to the next downcomer 2, this downcomer to the second riser, this again to the next downcomer, this downcomer to the third riser and this to the third downcomer, which is connected back to the first riser.

The unit is fed through the pipe 3 into the downcomer 2 which delivers into the first riser 1 only. On the other hand, steam is withdrawn through a lead-off pipe 6 provided at the upper part of each individual circulation unit formed of a riser and a downcomer.

The circulation in an individual unit is in this form no longer completely independent of the circulation in the other units, but the advantage is secured that the total circulation is divided into individual circulations and each circulation unit contains only a small mass of water, though variable between wide limits, and that at no point of the boiler can a large mass of water accumulate which by its inertia could check the circulation.

As a modified form, however, each downcomer of a group may be fed, as will be described below.

Figure 4:
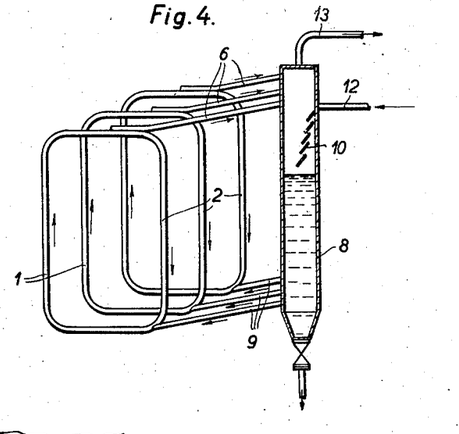
Figure 4 shows a modification having a plurality of circulating units fed from a reservoir.

Figure 4 shows circulating units with a reservoir 8 arranged in the feed pipe, the water level in this reservoir being lower than the points where the steam is led off and lower also than the uppermost heated sections of the risers 1 of the circulating units.

From the lower part of the reservoir, feed pipes 9 lead to the downcomers 2 of the circulation units, while steam lead-off pipes 6 deliver steam into the upper part of the reservoir. The feed water which flows into the reservoir after passing through a trickle preheater 10, for example, is heated by the steam in the reservoir 8. The feed pipe is indicated at 12, and the steam pipe leading to the place of consumption at 13.

This reservoir is then connected with the circulating units by the water inlet tubes which deliver into the downcomers. The feed is delivered into this reservoir and from it each unit takes the feed water required. In consequence, the water content in the tubes even with irregular feed or load varies less rapidly.

The water content of the boiler is in this way increased without exercising a disturbing influence on the circulating system. Such a reservoir, to which a water-level indicator can be fitted, is advantageously applied to larger boilers with several circulating systems connected in parallel. The water lever in the reservoir can, moreover, be subjected to larger variations of level, without endangering the cooling of the individual units.

It is, therefore, possible with a new boiler provided with this arrangement to withdraw suddenly, in a manner known in itself, larger quantities of steam, without the necessity of immediately adjusting the firing and feed, since even with smaller water content of the circulating units, the upper heated parts of the steam-generating tubes are still well cooled. On the other hand, the possibility exists of feeding boilers with reservoirs only from time to time.

Obviously it is not necessary that all the steam pipes of the circulation units should be led to the reservoir. All that is necessary is that a balance of pressure should be established between the reservoir and the circulation units, and for this purpose a connection of any sort between the steam lead-off sections of the circulation unit and the upper part of the reservoir is sufficient.

Figure 5:
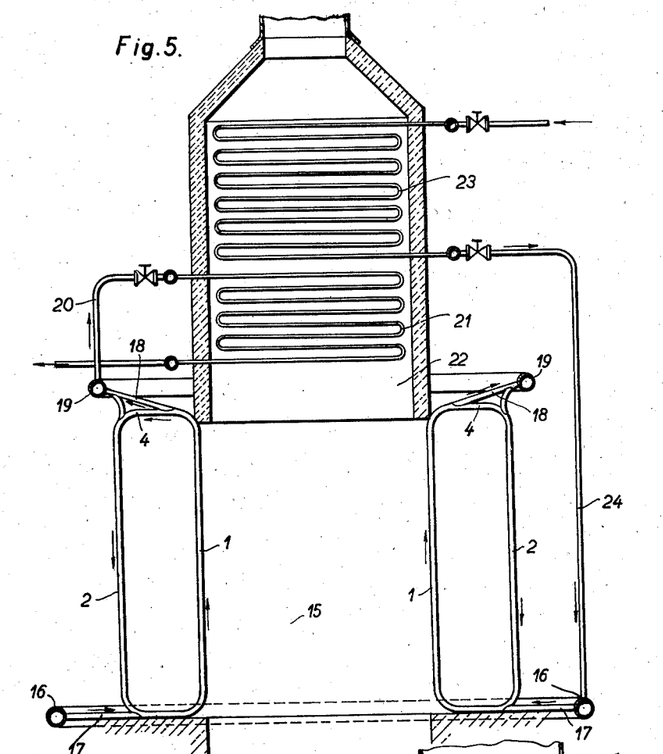
Figure 5 shows diagrammatically, in vertical section, a further example of the new water-tube boiler.
Figure 6:
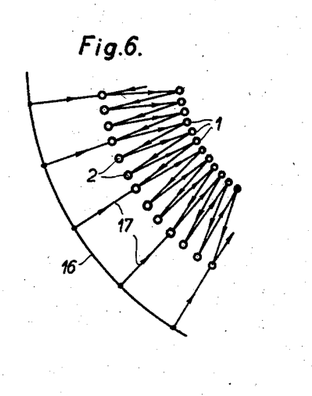
Figure 6 is a diagram of a part of the same in plan view.

In Figures 5 and 6, the risers 1 of the circulation units lie close together and form the wall of the combustion chamber 15, the circulation units being connected in series as already described with reference to Figure 3, in the case of a circulation group comprising three units.

The groups of units are connected in a set to form an annular coil closed upon itself, water being fed into each third downcomer, or one of each group, in the direction of the flow of fluid therein. The feed water is fed into a ring 16, from which feed pipes 17 lead to the proper downcomers. The steam generated in the risers is separated at the upper part of each circulation unit and led off through ducts 18 to the collector ring 19. From this ring 19 steam passes through a pipe 20 to a superheater 21 which is arranged in a flue 22 connected to the combustion chamber, while in the flue 22 above the superheater 21 a feed-water heater 23 is provided, from which a pipe 24 leads to the feed-water ring 16.

By thus connecting the new circulation units in series in such a way that the water content of the riser of a circulation unit, after separation of the steam, always flows into the downcomer of the next unit and the downcomer of the last unit is connected with the riser of the first unit, the sets of unit groups form a coil with horizontal axis which can be closed upon itself. In this way, a tube boiler is obtained which unites the characteristics of the coil boiler with vertical rising axis and of the tube boiler with a number of comparatively short riser tubes at a considerable angle.

Figure 7:
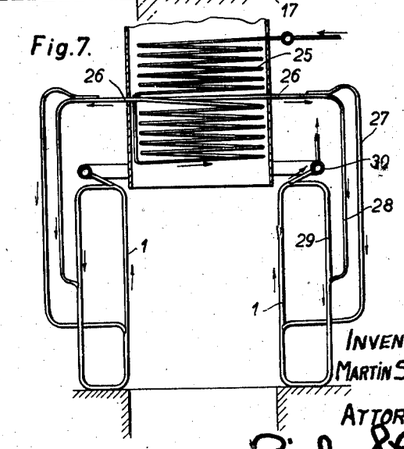

In Figure 7, the feed-water heater is indicated at 25 and is formed as a pre-evaporator. The tubes leading the steam-water mixture from the preheater 25 are indicated at 26, the steam being separated in these tubes and led through steam pipes 27 to the risers 1 of the circulating units.

Beyond the points where the steam pipes branch off, the tubes 28, connected to the tubes 26, contain water free from steam which is led into the downcomers 29 of the circulation units in the direction of the flow therein.

The circulation units can, by way of example, be arranged in an annulus as in Figures 5 and 6 or they can be arranged in any other suitable fashion.

The steam generated in each circulation unit is led off from its upper part to a steam collector 30.

In Figure 8, the wall surrounding the combustion chamber is formed of steam generating tubes arranged in a helical coil having the form of a six-threaded screw, the individual coils or tubes of the wall being indicated by the numerals 31 to 36. Each of the six coils, according to the invention, is connected by an unheated downcomer to a circulation unit, for example, the coil 31 is connected with the downcomer 27. The uppermost part of the coil passes without any sudden change of direction into the downcomer 37, which is so bent down at its lower end that it leads without sudden change of direction to the lower end of the coil 31 forming its inlet.

In this way each coil forms the riser of a circulation unit, the steam generated in this riser being led off at the upper end of the unit from the zone of transition between the riser part and the downcomer part. The steam lead-off pipe of the unit to which the riser 31 corresponds is indicated at 38.

To the steam lead-off pipes of the six circulation units, tubes are connected in which the superheating is effected. The superheater tube connected to the pipe 38 is indicated at 39. The superheater 40 formed of convolutions of these connecting tubes, lies, in the example illustrated, in a flue 41 connected to the combustion chamber. The steam led off from the circulation units of the steam-generating system flows therefore direct to the superheater.

In this form of the new boiler, notwithstanding the fact that the steam-generating tubes lie close together so as to form a wall, the boiler as compared with the single threaded coil has the advantage that it comprises only comparatively short tubes at a considerable angle with only a small resistance to flow. Also, in such a coil system, the water flows in parallel through the short circulating paths.

Only the steam generated is led off and as much water is fed into the system as is withdrawn in the form of steam. The circulating system remains the same, with the exception that the steam-generating tubes are substantially longer than the downcomers.

Figure 9:
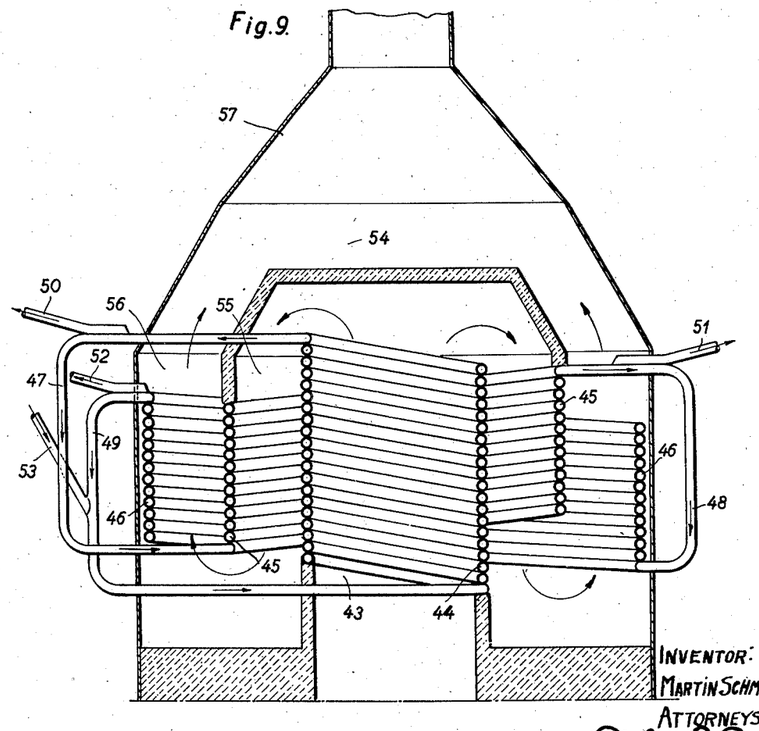
Figures 10, 11:
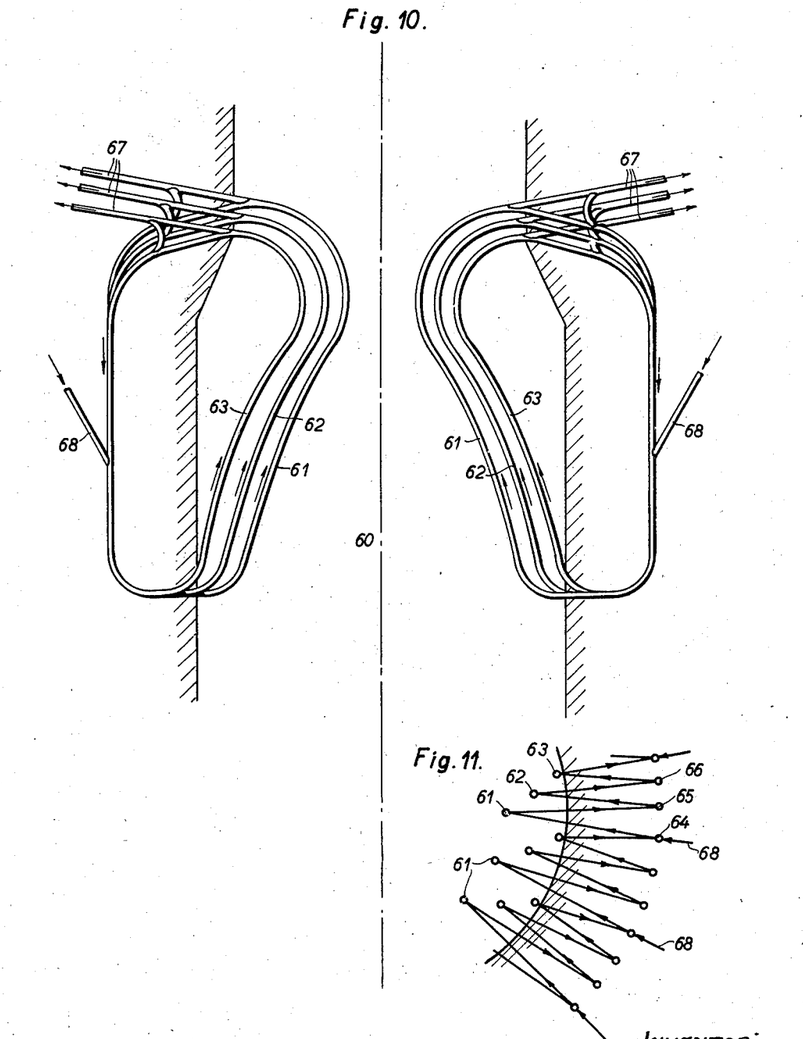
Figure 10 is a vertical section through yet another form of the invention.
Figure 11 is a diagram of a part of the same in plan view.

In Figures 9 and 10, circulation units highly heated to different degrees are connected in series.

In Figure 9 coiled tubes serve as risers, these tubes being wound, as in Figure 8, in the form of a six-threaded helix. The most highly heated coils 44 form the wall of the combustion chamber 43. Beyond the set of circulation units comprising these highly-heated risers, two other sets of circulation units are arranged whose risers 45, 46 are concentric with the tubes 44 and at a certain distance therefrom. The risers 44 of the first circulation units are connected to downcomers 47 which lead to the risers 45 of the second circulation units. These in turn are connected with downcomers 48 which lead to the risers 46 of the third circulation units; and these again are connected to the downcomers 49 which are led back to the risers 44 of the first circulation units.

For the sake of clearness in the drawings, the downcomers 47, 48 and 49 are shown only by single lines, although actually six risers and six downcomers would be provided. The device then consists of a set of six groups of units, each group comprising one unit in each coil.

The steam generated in the individual circulation units is led off at the upper part of each unit as indicated by the arrows 50, 51, 52. Feed water is introduced only into the most highly-heated circulation units, and preferably into the downcomers 49 which lead back to the risers 44, whereby the efficient cooling explained in the introduction to this specification is secured with respect to the most highly heated tubes. The point of introduction of feed water to the circulation units is indicated at 53.

The hot gases at the upper end of the combustion chamber 43 pass under a cover 54, and thence in a downward direction through a flue 55 to the lower end of a flue 56 which at its upper end is connected with the uptake 57.

It will be seen that the risers 44 of the first set of circulation units, which form the wall of the combustion chamber, are heated to the greatest extent and that the risers 45 of the second set of units, which form a wall separating the flues 55 56 are heated to a less extent; and that, finally, the outermost risers 46 of the third set of circulation units are heated to a still less extent by the already largely cooled combustion gases.

In the form of the invention shown in Figures 10 and 11, three groups of risers heated to different degrees are provided as before, these risers being connected with their corresponding downcomers to form circulation units. The risers are arranged round a combustion chamber so that the hot gases, therein rising from below, flow over series of tubes formed by the risers. The risers 61 lying nearest to the axis of the combustion chamber, are the most highly heated; the risers 62, next in order being heated less highly; and the risers 63, lying furthest from the axis, are heated to the least extent. The corresponding downcomers connected at their lowest ends with the risers 61, 62, 63 are indicated at 64, 65, 66.

All the risers and downcomers are connected in series, in a manner that will be obvious from Figure 11, so as to form sets of unit groups which in effect comprise one continuous coil. Feed-water is fed into the downcomers 64 which lead to the most highly-heated risers 61, so that these, as above explained, contain the largest quantity of water.

From each circulation unit formed of a riser and downcomer, steam is led off at the upper part and separated from the stream of water. Such a steam lead-off pipe is indicated in Figure 10 at 67, and the feed pipe connected to a downcomer 64 at 68. The circulation units 61 and 64 are arranged at a somewhat higher level than the units 62, 65 and these again somewhat higher than the units 63, 66. The apex of the circulating path of the most highly-heated unit thus lies at a somewhat higher level than that of the succeeding less highly-heated unit in which the steam-water mixture is raised to a somewhat less extent. In this way, consideration is taken of the fact that the circulating force is strongest in the riser which is heated to the greatest extent.

With individual circulating units thus connected in series to form a group, an advantageous form of the invention is obtained, inasmuch as the circulation units are heated less and less strongly according to their successive positions in series, the feed water being introduced into the unit heated to the highest extent. The largest quantity of fluid flows through the most highly heated riser so that an especially efficient cooling of the tube heated to the greatest extent, and consequently most exposed to damage, is secured.

While one form of separator suitable for use with water-tube boilers in accordance with the present invention has been described with reference to Figure 2, it will be understood that many other constructional forms embodying the same principle of maintaining the velocity of flow of the water are possible.

Figure 12:
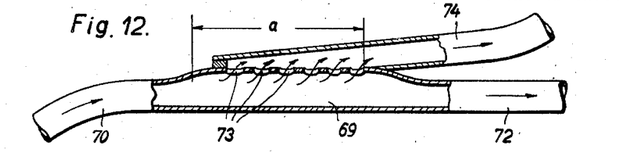
Figures 12 to 17 show different forms of construction of the separating apparatus, partly in elevation and partly in section.

Thus, in the form shown in Figure 12, the length of tube 69 in which the separation of the steam is completed from the moving mixture, is arranged horizontally.

In order to faciliate the separation of the steam, the cross-section of the tube 69 is enlarged as compared with the cross-section of the tubes 70 and 72.

The mixture, for example, any heated liquid which contains volatile particles, flows through the tube 70, while the liquid freed from such particles flows through the tube 72 to any point, for further use or treatment.

The volatile constituents separated along the length $a$ in the tube 69 pass through openings 73 in the upper tube wall to a lead-off pipe 74.

The individual openings through which the steam separated from the moving water passes from the mixture tube into the lead-off pipe could be replaced by any other suitable arrangement which would provide open space in the tube wall at points spaced along the length of the tube.

In certain circumstances, a lengthwise section of the tube may be provided with an enlarged cross-section, in such a way that the steam may freely separate from the stream of water over a sufficiently long stretch to a space inside the tube section, from which it passes to the lead-off tube.

Figure 13:
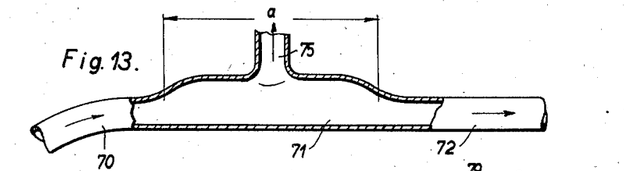

Such a form of construction is shown in Figure 13. The section of tube whose cross-section is greater than the cross-section of the inlet tube 70 and of the water-receiving tube 72 is indicated at 71.

Along the length $a$, steam from the stream of mixture can freely separate to the space provided in the upper part of the tube section 71 and from this space can flow into the lead-off pipe 75.

Figure 14:
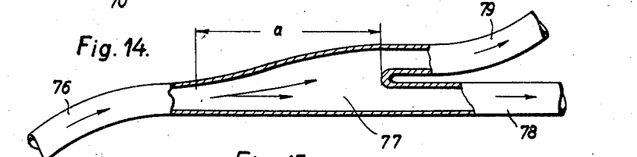

In Figure 14, the separation of the steam from the mixture is completed along the length $a$ of a section of tube 77 of gradually increasing cross-section connected to the inlet tube 76.

At the end of the length in which separation is effected, the tube 77 forks into a tube 78 and a tube 79. The water, without any change in its direction of flow, passes into the tube 78, and the separated volatile constituents are led off through the pipe 79.

Figure 15:
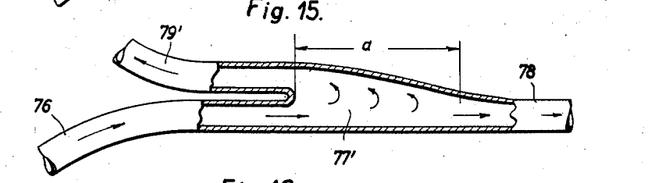

In the form shown in Figure 15, the separation of the steam from the mixture is likewise effected along the length $a$ of a tube section 77' of increasing cross-section connecting to the inlet tube 76. The tube section 77' passes, at the end of the length in which separation is effected, into the tube 78 in which the water continues to flow without change of direction.

The volatile constituents separated in the section 77' of the tube 76 are on the other hand led off through the pipe 79' branching off in a reverse direction from the section 77'.

Figure 16:
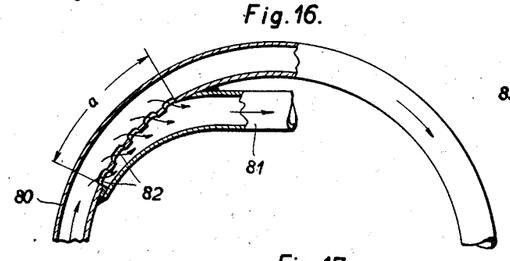

While in the constructional forms of the example described, it is assumed that the volatile constituents pass freely upwards from the moving mixture and the water continues to flow in the lower part of the tube, Figure 16 shows another form of construction in which the separation of the volatile constituents of the mixture flowing in a curved tube takes place on the inner side thereof.

The tube bent into a circular arc, for example, one convolution of a coil evaporator, is indicated by the numeral 80.

Under the action of centrifugal force, the liquid is compelled to move to the outer side of the tube while the steam collects along the inner wall, separation being effected along the length $a$. At this point, a lead-off pipe 81 is connected to the tube 80 on its inner side, into which issue holes 82 provided in the inner wall of the bent tube 80.

Figure 17:
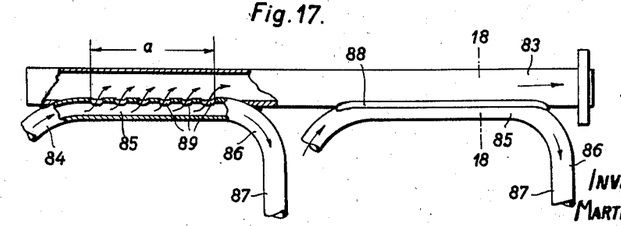
Figure 18:
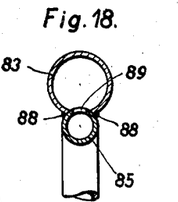
Figure 18 is a cross section on the line 18—18 of Figure 17.

Figures 17 and 18 show a constructional form in which steam is separated from the water flowing through a tube and passed into a connected container, two mixture tubes connected to a common container 83 being shown in the example illustrated.

As the regions of separation are similarly arranged, it will be sufficient to describe one of them. The riser tube 84 passes at its upper end into a straight length of tube 85, which is connected through a bend 86 to a downcomer 87.

The upper wall of the length of tube 85 enters a slot provided in the wall of the container 83, the connection being made water-tight by a welded seam 88.

In the upper wall of the length of tube 85, holes or slits 89 are provided which open into the container 83.

The steam separated from the flowing mixture along the length $a$ can pass freely through the slits 89 into the container 83, while the water outside the container continues its course through the tube 85 and the bend 86 to the downcomer 87.

While I have described herein certain forms of my invention, I wish it to be understood that I do not intend to limit myself thereby except within the scope of the appended claims.

I claim:

1. A water-tube steam generator, which in addition to the quantity of water continuously fed in and evaporated during one passage through the boiler, contains an additional mass of water, units comprising steam-generating tubes and downcomer tubes, means connecting said steam-generating tubes and said downcomer tubes the steam-generating tubes of each circulating unit being continuously connected with the downcomers of the next unit, to form a group of units having a substantially closed circulating path, and means in said connecting means to separate the steam from the water-steam mixture produced in said steam-generating tubes, whereby the water in said mixture after separation of steam therefrom may continue to flow through said downcomer tubes.

2. In a steam generator as claimed in claim 1, means to introduce feed water into a plurality of said units.

3. A water tube steam generator, which, in addition to the quantity of water continuously fed in and evaporated during one passage through the boiler, contains a small additional quantity of water, comprising steam-generating tubes, and downcomer tubes, means connecting said steam-generating tubes and said downcomer tubes to form circulating units, means in said connecting means to separate the steam from the water-steam mixture produced in said steam-generating tubes, whereby the water in said mixture after the separation of steam therefrom may continue to flow through said downcomer tubes, means to collect the steam separated by said separating means, and means independent of said collecting means to introduce feed water into the lower portion of at least some of said circulating units.

4. A water tube steam generator, which, in addition to the quantity of water continuously fed in and evaporated during one passage through the boiler, contains a small additional quantity of water, comprising steam-generating tubes, and downcomer tubes, means connecting said steam-generating tubes and said downcomer tubes to form circulating units, in which the circulating water content of the steam generator is divided into a plurality of circulating units, means in said connecting means to separate the steam from the water-steam mixture produced in said steam-generating tubes, whereby the water in said mixture after the separation of steam therefrom may continue to flow through said downcomer tubes, upper and lower headers, means connecting the steam separating means of a plurality of said circulating units to said upper header, means connecting said lower header to a plurality of said units, and means to feed water to said lower header.

5. A water tube steam generator, which, in addition to the quantity of water continuously fed in and evaporated during one passage through the boiler, contains a small additional quantity of water, comprising steam-generating tubes, and downcomer tubes, means connecting said steam-generating tubes and said downcomer tubes to form circulating units, in which the circulating water content of the steam generator is divided into a plurality of circulating units, means in said connecting means to separate the steam from the water-steam mixture produced in said steam-generating tubes, whereby the water in said mixture after the separation of steam therefrom may continue to flow through said downcomer tubes, said units being disposed around an axis, upper and lower annular headers, means connecting the steam separating means of a plurality of said circulating units to said upper header, means connecting said lower header to a plurality of said units, and means to feed water to said lower header.

6. A water tube steam generator comprising a circulatory system of steam generating tubes, downcomer tubes, connecting means for said generator tubes and downcomer tubes, feed water tubes for said downcomer tubes, steam and water separating means in said connecting means, and means to conduct separated water to said downcomer tubes, said feed tubes being connected to the lower portions only of said downcomer tubes whereby low water columns are maintained in said downcomer tubes and the velocity of separated water past said separating means is substantially retained in said circulatory system.

7. A water tube steam generator comprising a furnace, steam generating tubes in said furnace, downcomer tubes outside of said furnace, tubes connecting said generator tubes and said downcomer tubes, separating means in said connecting tubes to separate water from a steam-water mixture, steam collecting means connected to said separating means, means to conduct the separated water into said downcomer tubes, and means to introduce feed water into said downcomer tubes.

8. A water tube steam generator as in claim 7, wherein the feed water tubes are separate from said steam collecting means and are connected to the lower portions of said downcomer tubes.

9. A water tube steam generator, which, in addition to the quantity of water continuously fed in and evaporated during one passage through the boiler, contains a small additional quantity of water, comprising steam-generating tubes wound in the form of a multi-threaded coil, and downcomer tubes, means connecting said steam-generator tubes and said downcomer tubes, means in said connecting means to separate the steam from the water-steam mixture produced in said steam-generator tubes, whereby the water in said mixture after the separation of steam therefrom may continue to flow through said downcomer tubes, means to conduct off the steam separated by said separating means, and means unconnected with said conducting means to introduce water into at least some of said tubes.

MARTIN SCHMIDT.